United States Patent Office
2,849,858
Patented Sept. 2, 1958

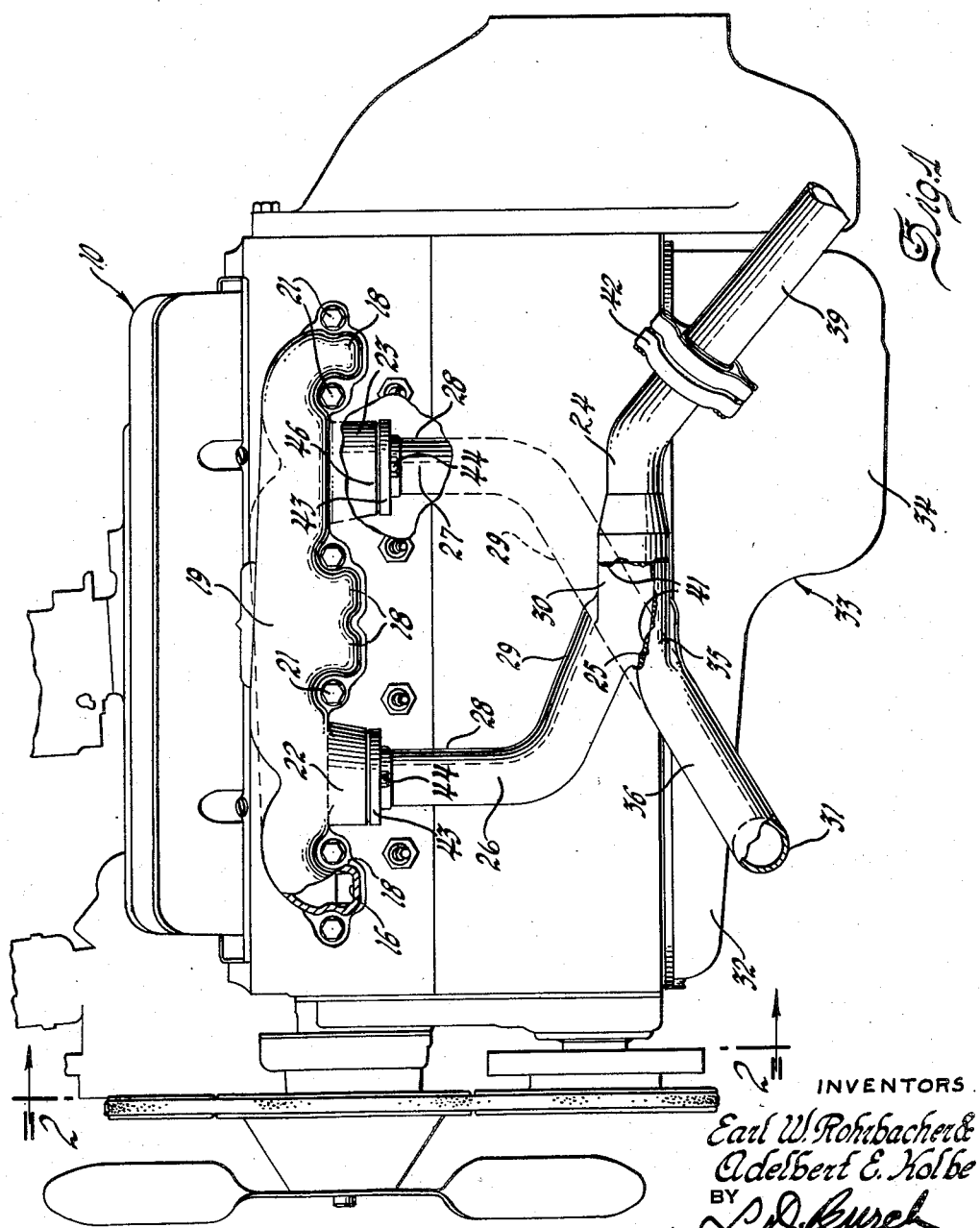

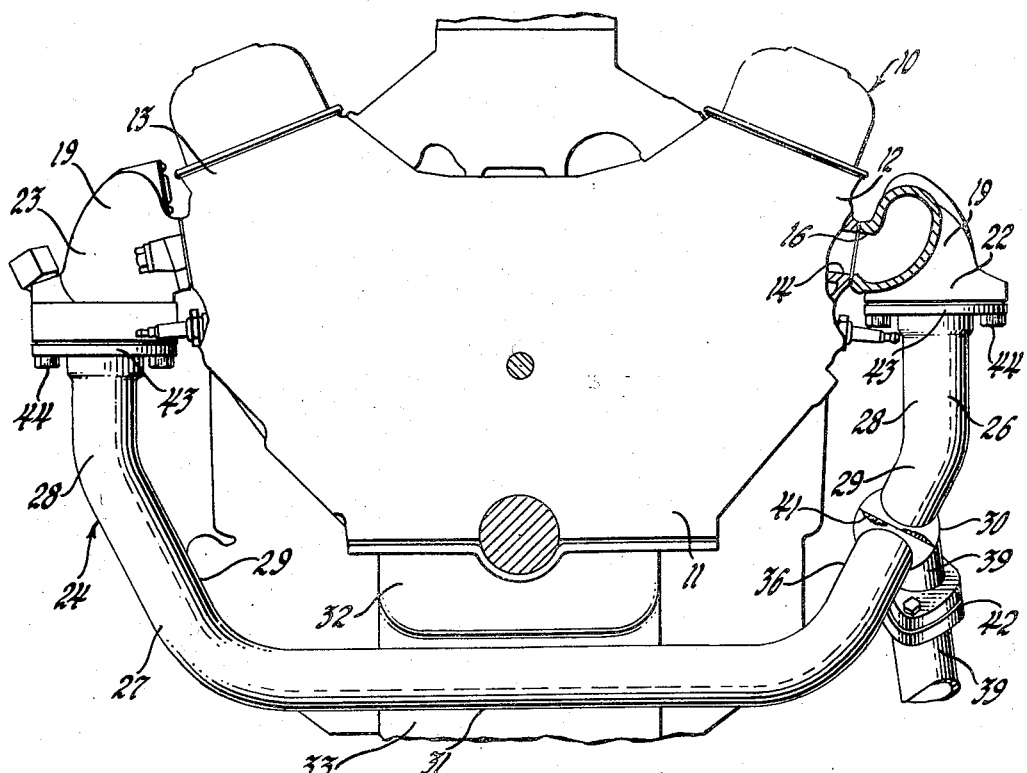
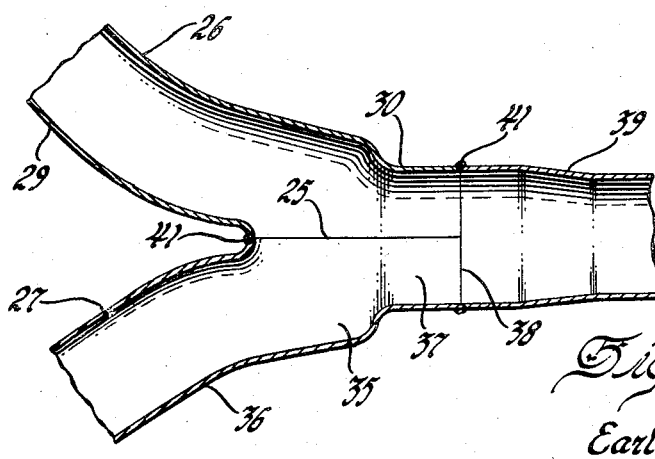

2,849,858

EXHAUST SYSTEM FOR ENGINES

Earl W. Rohrbacher, Birmingham, and Adelbert E. Kolbe, Detroit, Mich., assignors to General Motors Corporation, Detroit, Mich., a corporation of Delaware Application September 29, 1954, Serial No. 459,160

7 Claims. (Cl. 60—29)

This invention relates to internal combustion engines for automotive and other uses and has particular relation to exhaust systems for internal combustion engines having parallel rows of cylinders and from which products of combustion may be discharged through a single outlet conduit.

It is proposed to so construct an internal combustion engine and the exhaust system therefor that the exhaust system may be easy to install, economical to construct, easy to handle and to transport and may be capable of being installed on the engine to provide room for servicing the engine and for installing thereabout the various controls and auxiliary apparatus usually employed with engines in such installations.

In the drawing:

Figure 1 is a side elevational view of an internal combustion engine having an exhaust system embracing the principles of the invention.

Figure 2 is a front end view of the engine as the latter might appear substantially in the line 2—2 on Figure 1. Certain parts of the structure are broken away to more clearly illustrate the interior structure of the engine and the system.

Figure 3 is an enlarged fragmentary cross-sectional view of a part of the exhaust system as shown in Figure 1.

The engine 10 embracing the invention comprises an engine block 11 having parallel rows of cylinders 12 and 13 formed therein. Each of the cylinders in the rows is provided with exhaust passage means 14 which is adapted to discharge products of combustion into intake ports 16 leading to branches 18 of exhaust manifolds 19 which may be secured by bolts 21 to opposite sides of the engine. The manifolds 19 are formed to provide manifold outlets 22 and 23 adjacent the opposite ends thereof which support the bifurcated exhaust conduit system 24 for the engine.

The manifolds 19 may be similar or identical in construction, with each manifold having a manifold outlet adjacent one end thereof and so that when the manifolds are reversed and placed on opposite sides of the engine one of the manifold outlets 22 will be near the front of the engine while the other manifold outlet 23 is near the rear of the engine. It is proposed to construct the lower ends of the manifold outlets 22 and 23 in planes parallel to the horizontal plane of the engine so that the exhaust passages within the manifold outlets may extend vertically downwardly in parallel relation to both the longitudinal and transverse planes of the engine.

The bifurcated exhaust conduit system 24 may comprise a short branch conduit 26 and a long branch conduit 27, the two being joined together along edges 25 to provide a branch conduit junction 30. Each of the branch conduits 26 and 27 has a section 28 adapted to extend vertically downwardly beneath the manifold outlets 22 and 23. Below the sections 28 the conduits 26 and 27 are curved inwardly toward the lower part of the engine to provide obliquely disposed sections 29. The branch conduit 26 is curved so that the section 29 extends rearwardly as well as inwardly of the engine whereas the branch conduit 27 is curved so that the section 29 extends forwardly as well as inwardly of the engine. The branch conduit 27 is also curved to provide a horizontally disposed section 31 that extends across the engine beneath the front end 32 of the oil pan 33 for the engine. The oil pan 33 is formed to provide a shallow front end such as that indicated at 32 and a deeper rear end such as that indicated at 34. The section 31 extends across the engine beneath the shallow front end 32 of the oil pan 33 and substantially nearer the front end of the oil pan than to the deeper rear end indicated by the numeral 34. The opposite end of the branch conduit 27 has a section 36 which extends upwardly and rearwardly on the adjacent side of the engine. The sections 29, 31 and 36 of the branch conduit 27 form a loop in a plane which is disposed obliquely with respect to the transverse vertical plane of the engine. Beyond the section 36 the branch conduit 27 is curved laterally to provide a section 35 which joins section 29 of branch conduit 26 at junction 30 to provide an outlet passage 37 which is substantially larger in cross-sectional area than the cross-sectional area of either of the branch conduits 26 or 27. The ends of the branch conduits 26 and 27 forming the junction 30 are formed and enlarged as indicated to provide the oppositely disposed edges indicated at 25 and to streamline the flow of fluid received from the branch conduits and discharged into the outlet passage 37. Also, the ends of the branch conduits are cut off normally to the plane of the edges 25 to join at 38 with the edges of the end of an outlet conduit 39 which is adapted to be secured to the branch conduits 26 and 27 at the junction 30 and in a position to form a continuation of the outlet passage 37. At the junction 30 the edges 25 and 38 of the conduits 26, 27 and 39 may be secured together in any suitable manner as by the weld indicated at 41. The outlet conduit 39 may be of any desired length and may employ coupling means such as that indicated at 42 for connecting different sections thereof together. The branch conduits 26 and 27 may be provided with coupling flanges 43 at the upper ends thereof which are adapted to be secured to the manifold outlets 22 and 23 by bolts 44. One of said coupling flanges 43 may be secured to the manifold outlet of one or the other of the manifolds 19 through the body of an inlet manifold heat control valve 46, if desired to employ such a valve.

The bifurcated exhaust conduit system 24 may be manufactured as a single unit and may be installed upon or removed from the engine with ease. Due to the similar but opposite angles at which various parts of the structure are constructed, to the parallel relation of certain parts, to the plane construction of certain parts and to the symmetrical relation between the angles at which certain parts are disposed it is apparent that the exhaust conduit structure is capable of high production at low cost and can be readily transported, stored, serviced and assembled.

We claim:

1. An exhaust system for engines having parallel rows of cylinders and having exhaust manifolds formed to provide manifold outlets opening downwardly adjacent the opposite ends of said manifolds and disposed on opposite sides of said engines and comprising a bifurcated conduit structure having branches adapted to be secured to said manifold outlets, one of said branches having a section extending downwardly and a section extending downwardly and inwardly and rearwardly from one of said manifold outlets on one side of said engine, the other of said branches having a section extending downwardly and a section extending downwardly and inwardly and forwardly from the other of said manifold outlets and on the opposite side of said engine and being formed to provide a loop extending obliquely and forwardly beneath said enginer and including a section extending upwardly and outwardly and rearwardly substantially in the plane of said downwardly and inwardly and rearwardly extending section and said loop of said one of said branches, said branch conduits having the ends thereof opposite said manifold outlets enlarged and expanded and secured together to provide a junction along the length of said branches and to provide an enlarged outlet passage extending rearwardly of said engine and within said junction, an outlet conduit secured to the end of said junction and forming an extension of said outlet passage, and means for securing said bifurcated conduit structure to said manifold outlets on opposite sides of said engine.

2. An exhaust system for engines as defined by claim 1 and in which the sections of said branch conduits adjacent the ends thereof which are adapted to be secured to said manifold outlets are formed to extend substantially downwardly in parallel relation to one another and to the longitudinal and transverse vertical planes of said engine.

3. An exhaust system for engines as defined by claim 1 and in which the ends of said branch conduits which are secured together along the length of said branch conduits to provide said junction and said outlet passage are secured together along edges of said branch conduits that lie in a plane extending substantailly normal to the plane of the end of said outlet conduit.

4. An exhaust system for engines as defined by claim 1 and in which the ends of said branch conduits which are secured together to form said junction and said outlet passage and the end of said outlet conduit which is secured to the ends of said branch conduits are welded together along edges of said conduits that lie in substantially normally disposed planes.

5. An exhaust system for engines as defined by claim 1 and in which the ends of said branch conduits which are secured together to form said junction and said outlet passage are expanded to provide an outlet passage of greater diameter than the diameters of said branch conduits.

6. An exhaust system for engines as defined by claim 1 and in which said loop in said other of said branch conduits is formed in a plane disposed obliquely to the transverse plane of said engine and in a plane that is disposed at an angle which is the same but opposite the angle of the plane of said downwardly and inwardly and rearwardly extending section of said one of said branch conduits with respect to said transverse plane of said engine.

7. A bifurcated exhaust conduit structure as defined by claim 1 and in which said loop is formed in an obliquely disposed plane which is intersected by said one of said branch conduits at the junction of said branch conduits forming said outlet passage and at substantially the same angle as said plane of said loop is formed with respect to the transverse plane of said engine.

References Cited in the file of this patent

UNITED STATES PATENTS

| | | |
|---|---|---|
| 1,132,858 | Knight | Mar. 23, 1915 |
| 1,761,960 | Armitage | June 3, 1930 |
| 1,984,242 | Trainer et al. | Dec. 11, 1934 |
| 2,305,046 | Wilson et al. | Dec. 22, 1942 |
| 2,388,924 | Mercier | Nov. 13, 1945 |
| 2,533,720 | Danel | Dec. 12, 1950 |
| 2,571,254 | Keller | Oct. 16, 1951 |
| 2,603,199 | Moseley | July 15, 1952 |
| 2,667,151 | Marx | Jan. 26, 1954 |
| 2,757,652 | Rothwell | Aug. 7, 1956 |

FOREIGN PATENTS

| | | |
|---|---|---|
| 707,344 | France | Apr. 13, 1931 |
| 869,688 | France | Nov. 17, 1941 |